Sept. 6, 1927.
E. ROUČKA
1,641,200
SYSTEM OF MEASURING BY IMPULSES OF AUXILIARY ENERGY
Filed Aug. 20, 1923
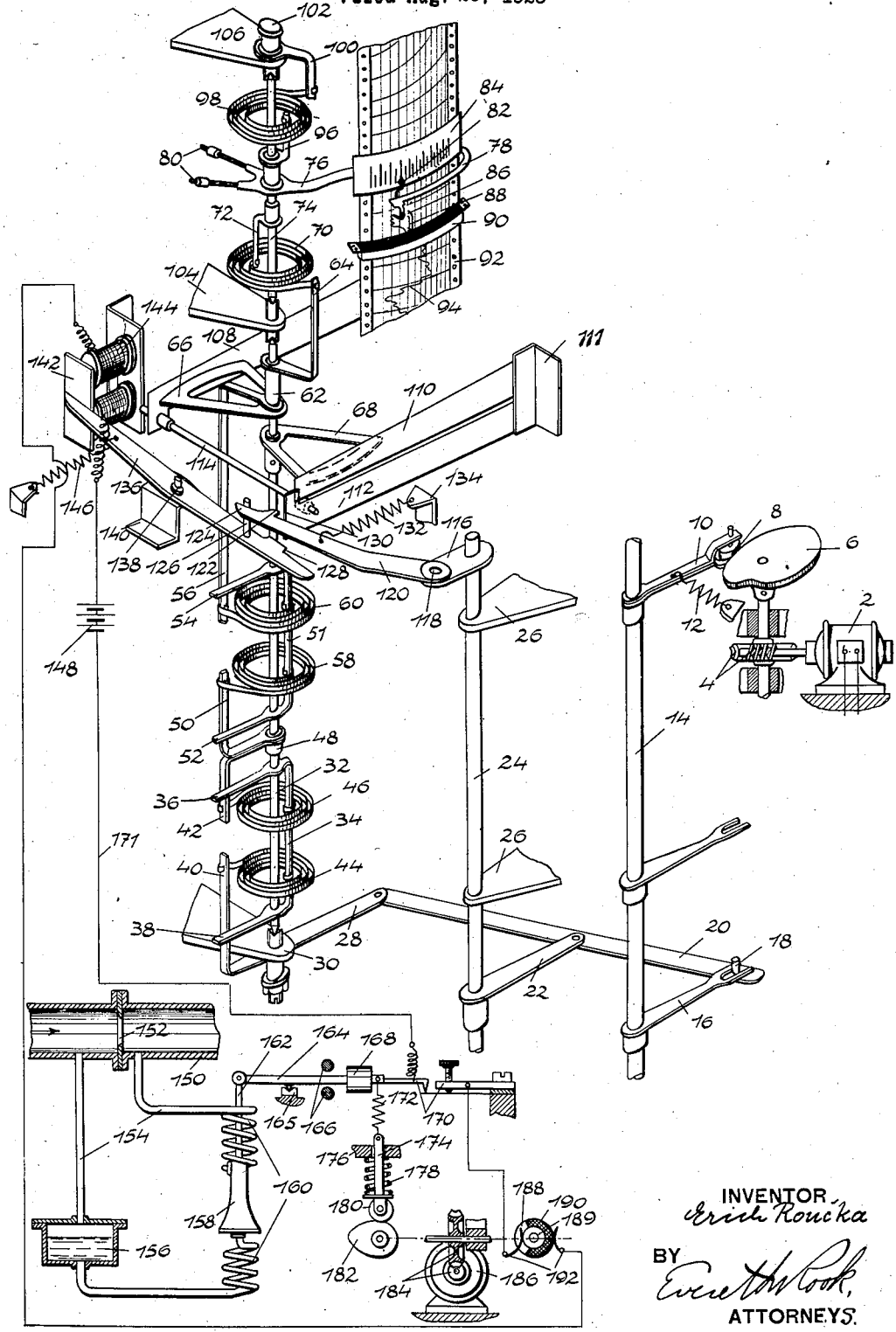
INVENTOR
Erich Roučka
BY
ATTORNEYS.

Patented Sept. 6, 1927.

1,641,200

UNITED STATES PATENT OFFICE.

ERICH ROUČKA, OF BLANSKO, CZECHOSLOVAKIA.

SYSTEM OF MEASURING BY IMPULSES OF AUXILIARY ENERGY.

Application filed August 20, 1923, Serial No. 658,351, and in Czechoslovakia September 1, 1922.

This invention relates in general to a system for transmitting or measuring variations in a value, such as a quantity, quality, or condition by means of impulses of auxiliary energy which are produced at different time positions in regular intervals of time so that the time position or relation of said impulses in or to corresponding intervals of time are dependent upon and functions of and measures for said variations.

The primary object of the present invention is to provide in a system of the character described means for varying the position of a movable member in accordance with the said time positions of said impulses in corresponding intervals of time. In other words, the invention consists in the provision of a novel and improved device for receiving said impulses actuated by cooperation of said impulses and mechanism movable in cycles of regular intervals of time corresponding to the intervals during which said impulses are produced, to vary the position of a movable member in accordance with the time positions of said impulses in corresponding ones of said intervals of time.

Another object is to provide in such a system novel and improved automatic means for causing successive actuation of said regularly movable means and said movable member, the time of such successive actuations being determined by the time positions of said impulses in corresponding ones of said intervals of time.

A further object is to provide a yielding connection between said regularly movable means and said movable member and means for temporarily restraining movement of said movable member with said regularly movable means and automatically simultaneously stopping movement of said regularly movable means and releasing said movable member upon the production of each of said impulses, whereby said yielding connection moves said movable member into a position corresponding to the position of said regularly movable means when motion of the latter ceases.

Other objects are to provide a novel construction of brake mechanism for controlling movement of said regularly movable mechanism and said movable member; to provide a novel and improved yielding connection and arrangement of said movable member and said regularly movable means, and to obtain other results and advantages as may be brought out by the following description.

The impulse receiving and recording mechanism constituting the invention is adapted to be utilized in connection with any suitable impulse transmitting system, and in the accompanying drawings I have shown the recording mechanism used in connection with a transmitting system substantially identical with that disclosed in my co-pending application filed January 2, 1923, Serial No. 610,389.

Referring to said drawings, the figure is a schematic perspective view of an impulse receiving and recording mechanism embodying my invention, showing the same used in connection with an impulse transmitting system shown diagrammatically in cross-section.

In the specific embodiment of the invention shown on the drawing, the reference characters 150—192, inclusive, designate an impulse transmitting system for producing impulses of auxiliary electric energy from a source 148 at different time positions in equal intervals of time so that the time positions or relations of said impulses in the corresponding time intervals are functions of the value being transmitted.

The impulse receiving and recording mechanism constituting the invention includes a synchronous electric motor 2 which may be connected to any suitable source of alternating current and which drives a cam 6 through worm and worm wheel gearing 4, so that said cam is rotated in cycles of equal intervals of time corresponding to the intervals of time during which said impulses of auxiliary energy are produced. An arm 10 has one end thereof fixedly connected to a shaft 14 and the other end carrying a follower roller 8 adapted to ride upon the periphery of the cam 6, said roller being maintained in engagement with the cam by a tension spring 12. The shaft 14 also carries an arm 16 having a pin and slot connection 18 with a link 20 which is also pivotally connected to one end of a lever 28 pivotally mounted intermediate its ends on a fixed support 30, so that said lever 28 is oscillated synchronously with the movement of the cam 6 and arm 10, or in any other desired manner, with each position of said lever corresponding to a certain magnitude of the value being transmitted. The end of said lever 28 opposite the link 20 is provided with an angularly projecting arm 40 connected to one end of a spiral spring 44, the other end of which is fixedly connected to a member 34 which is revoluble on a shaft 32 co-axial with the pivot of the lever 28 and has arms 36 and 38 projecting at right angles to said shaft. The said shaft 32 is also provided with a pair of oppositely disposed arms 42 and 50 fixedly connected to the shaft by a member 48, the arm 42 being connected to the end of a spiral spring 46 the opposite end of which is connected to the member 34. The arm 50 is connected to one end of a spiral spring 58 the other end of which is fixedly connected to a member 51 similar to the member 34 which is provided with the arms 52 and 54 similar to the arms 36 and 38. Another spiral spring 60 has one end thereof fixedly connected to the member 51, and the other end connected to an arm 56 carried by a sleeve 62 loose on the shaft 32. All of the springs 44, 46, 58 and 60 are normally under mechanical tension which causes the arm 38 to be pressed against the arm 40, the arm 36 against the arm 42 and the arm 54 against the arm 56.

The shaft 32 is provided with a brake segment 68 adapted to cooperate with a resilient brake strip 110 having one end fixedly connected to a fixed support 111 with the other end adapted to normally engage said brake segment. The sleeve 62 is provided with a brake segment 66 arranged substantially diametrically opposite to the brake segment 68 and cooperating with a brake strip 108 similar to the strip 110. A resilient strip 112 has one end fixedly connected to the support 111 and the other end underlying the free end of the brake 110, said strip 112 being rigidly connected by a rod 114 to the brake strip 108, so as to normally influence said brake strip 108 out of engagement with the segment 66 and permit engagement of the brake strip 110 with the segment 68.

The brake strip 108 is normally held in engagement with the brake segment 66 against the action of the spring 112 by means of a lug 128 carried by one end of a lever 136 pivotally mounted intermediate its ends on a fixed support as at 140, the other end of said lever carrying an armature 142 cooperating with electromagnets 144 carried by an extension of the rod 114 and connected in circuit with the source of auxiliary energy 148. The armature 142 is normally influenced away from said magnets 144 by means of a tension spring 146, thereby holding the lug 128 in engagement with the strip 112.

Upon the production of each impulse of auxiliary energy by the transmitting system 150—192, the electromagnets are energized so as to attract the armature 142 and move the lug 128 out of engagement with the spring 112, whereupon said spring actuates the brake strip 108 out of engagement with the segment 66. Simultaneously, the brake strip 110 is influenced into engagement with the brake segment 68. Upon deenergization of the magnets 144 when the impulse of auxiliary energy ceases, the brake strip 108 is moved into engagement with the segment 66, and the brake strip 110 is moved out of engagement with the brake segment 68 by means of a lug 122 carried by one end of a link 120 pivotally connected at its other end to an arm 116 carried by a shaft 24 journaled in fixed bearings 26 and provided with an arm 22 pivotally connected to the link 20. The lug 122 is normally influenced into the path of the free end 130 of the strip 112 by means of a spring 132 so that upon oscillation of the shaft 24 in one direction, the lug 122 engages said end 130 of the strip 112 and actuates the strip to move the brake strips 108 and 110 as above described. When the brake strip 112 is released by the lug 128 on the lever 136, the lug 122 is simultaneously moved out of the path of the end 130 of the strip 112 by means of a stud 126 carried by the lever 136 engaging the end 124 of the link 120.

With this construction it will be observed that the tensions of the springs 44, 46, 58 and 60 are constantly varied in accordance with the rotation of the cam 6 and that the sleeve 62 and brake segment 66 are normally held against movement so that the shaft 32 normally moves relatively to the sleeve 62. When the impulse of auxiliary energy actuates the electromagnet 144 and the lever 136, the brake segment 68 is held against movement and the brake segment 66 simultaneously released, whereupon the sleeve 62 is oscillated by the tension in the springs 44, 46, 58 and 60 into a position corresponding to the position of the segment 68 when its movement was interrupted. The link 120 being constantly reciprocated by the cam 6 will at the beginning of the next interval of time return the brake strips 108 and 110 to their normal position, thereby releasing the brake segment 68 and holding the brake segment 66 against further movement until the next impulse of auxiliary energy. Obviously, the time positions of said impulses of auxiliary energy in the corresponding intervals of time determined by the rotation of the cam 6, will be functions of the value controlling the production of the impulses, and the position of the sleeve 62 after its release upon the production of an impulse will also be a function of the said value.

The sleeve 62 is provided with an arm 64 which is yieldingly connected to a movable member for indicating the time positions of the said impulses of auxiliary energy in corresponding intervals of time. In the construction shown in the drawing, a shaft 74 is journaled in bearings between fixed supports 104 and 106 coaxially with the shaft 32, said shaft 74 having an arm 72 to which is connected one end of a spiral spring 70 the other end of which is connected to the said arm 64 on the sleeve 62. An indicating arm 76 is rigidly connected to said shaft 74 and carries at its extremity a pointer 82 movable over an arcuate indicating scale 84 concentric with the shaft 74, said pointer being mounted on a curved end 78 of the arm 76 which overlies the front of the indicating scale 84. With this construction, it will be obvious that movement of the sleeve 62 when the brake segment 66 is released will produce a corresponding movement of the pointer 82 over the scale 84. The said scale is of a length corresponding to one of said intervals of time, and thus the position of the pointer 82 on said scale will indicate the time position of an impulse of auxiliary energy in a corresponding interval of time. The function of the spring 70 is to absorb the sudden movement of the sleeve 62 when the brake segment is released and provide for slow and smooth movement of the pointer 82. Preferably, the indicating arm 76 is counterbalanced by adjustable counterweights 80 to further enhance smoothness of operation. If desired, the extremity of the indicating arm may be provided with a damping blade 88 submerged in a damping fluid, such as oil or glycerine, in a container 90. For the purpose of recording the various time positions indicated by the pointer 82, the indicating arm may be provided with a pen point 86 movable over a traveling record strip 92 to produce a permanent record line 94 thereon.

For purposes of adjusting the indicating arm 76 and pointer 82 to the zero position, the shaft 74 is provided with a second arm 96 to which is connected one end of a spiral spring 98, the other end of which is connected to an adjusting arm 100 adapted to be rotated by a thumb nut 102. Obviously by rotation of the thumb nut 102 the zero position of the indicating pointer 82 may be accurately adjusted. This spring 98 is of light tension and cooperates with the spring 70.

For the purpose of clearly describing the use of the impulse receiving and recording mechanism, the impulse transmitting mechanism is hereinafter described. The reference character 150 designates a pipe or conduit through which flows a fluid to be measured, said conduit being provided with a throttling orifice member 152 which produces a difference in pressure at opposite sides thereof. A receptacle 156 for a fluid of greater specific gravity than that of the fluid being measured is connected to the conduit 150 at one side of the throttle orifice, said receptacle being also connected by means of a helical coil of tubing 160 to one end of a second receptacle 158, the other end of which is connected by another helical coil 160 to the conduit 150 at the other side of the orifice. The receptacle 156 is connected by a rod 162 to one end of a lever 164 pivotally mounted intermediate its ends as at 165. The end of the lever 164 opposite the rod 162 is connected by a spring 172 to one end of a rod 174, the other end of which carries a roller 180 following a cam 182 driven through suitable gearing 184 from a synchronous electric motor 186 connected to any suitable source of alternating current. The roller 180 is maintained in engagement with the cam 182 by means of a spring 176. A counterweight 168 on the lever 164 balances the receptacle 158 and coils 160.

In the operation of the system so far described, upon a difference in pressure in the conduit 150 at opposite sides of the orifice 152, the fluid in the receptacles 156 and 158 is compressed so as to extend or contract the coils 160. This motion is transmitted by the rod 162 to the lever 164 which is oscillated about its pivot 165, said oscillation being limited by fixed stops 166. The magnitude of the quantity or quality actuating the lever 164 is periodically compensated by means of the spring 172, the tension of which is periodically varied in intervals by the cam 182, one complete revolution of which constitutes one interval of time synchronous with the cam 6.

The lever 164 carries a contact member adapted to cooperate with a resilient strip which is in turn adapted to cooperate with a fixed contact as indicated at 70, the said contact member being connected by the wire 191 through the source 148 of auxiliary electric energy to the receiving or recording device and thence to a rotary switch 190. When the lever 164 is oscillated in one direction the contact member engages the strip so as to close the circuit through the auxiliary energy, thereby producing an impulse or sudden change of auxiliary energy. The duration of said impulse is determined by the length of time necessary for the member to move the strip from engagement with the contact.

The purpose of the rotary switch 190 is to prevent a closing of the impulse producing circuit when the switch mechanism 170 returns to its normal position. The said rotary switch comprises a substantially cylindrical body portion 190 formed of insulation and having a segmental conducting portion 188 which is in electrical contact with a cylindrical conducting portion 189. The length of the segmental portion 188 corresponds to the interval of time determined by the cam 182 and is driven from the same shaft as the cam 182 by the motor 186. The body portion of the switch and the cylindrical conducting portion 189 are engaged by the respective brushes 192.

It will be observed that the movable member or indicating hand 82 is periodically actuated by cooperation of the shaft 32 regularly oscillated by the cam 6 and the electromagnets 144 and lever 136 which are controlled by the impulses of auxiliary energy. Further, it should be noted that the device 62, 64, 66 is maintained in the position indicating the time position of the last impulse until the next impulse is produced. In other words, the said device does not return to zero after each impulse but moves from each position immediately upon the production of the next impulse into a position corresponding to that of the time position of the last-mentioned impulse.

The present application is based particularly upon receiving means for impulses of auxiliary energy produced at different time positions in different intervals of time in accordance with variations in the magnitude of a value. The general combination of means for transmitting such impulses and means for receiving said impulses is described and claimed in my copending application Serial No. 625,153, filed March 14, 1923. The present receving means is adapted for use with different transmitting means of this general type, and accordingly the claims in this application are based upon the receiving means.

While I have shown and described the impulse receiving and recording mechanism as embodying certain details of construction, it will be understood that this is only for the purpose of illustrating the principles of the invention and that many modifications and changes can be made in the details of construction without departing from the spirit or scope of the invention.

Having thus described the invention, what I claim is:

1. A receiving means for use in a value transmitting or measuring system wherein impulses of auxiliary energy are produced at points in cycles of regular intervals of time corresponding to the magnitude of the value to be transmitted or measured, comprising a member movable in cycles of regular intervals of time synchronous with the intervals in which the impulses are produced, means for so moving said member, a movable device one position of which is to correspond to the time position of each of said impulses, means yieldingly connecting said device and said member for corresponding and relative movement, and means normally restraining said device from movement with said member but actuated by an impulse of energy for releasing said device to permit it to assume a position corresponding to the position of said member at the instant of said impulse.

2. A receiving means for use in a value transmitting or measuring system wherein impulses of auxiliary energy are produced at points in cycles of regular intervals of time corresponding to the magnitude of the value to be transmitted or measured, comprising a member movable in cycles or regular intervals of time synchronous with the intervals in which the impulses are produced, means for so moving said member, a movable device one position of which is to correspond to the time position of each of said impulses, means yieldingly connecting said device and said member for corresponding and relative movement, means normally engaging said device for restraining said device from movement with said member, normally disengaged means for restraining said member from movement, and means actuated by an impulse of auxiliary energy for releasing said device-restraining means and applying said member-restraining means to permit said device to assume a position corresponding to the position of said member at the instant of said impulse.

3. A receiving means for use in a value transmitting or measuring system wherein impulses of auxiliary energy are produced at points in cycles of regular intervals of time corresponding to the magnitude of the value to be transmitted or measured, comprising a mechanism movable in regular cycles or equal intervals of time synchronously with the before-mentioned cycles, means for actuating said mechanism, a yielding connection between said mechanism and said means permitting actuation of said mechanism by said means in one direction and relative movement between said means and said mechanism in the opposite direction, a movable device one position of which is to correspond to the time position of each of said impulses, a yielding connection between said device and said means whereby said device is actuated by said means in one direction and is relatively movable thereto in the other direction, brake means for simultaneously holding said device against movement and releasing said mechanism and vice versa, means actuated by the first-mentioned means to actuate said brake means to hold said device and release said mechanism, and means actuated by said impulses of auxiliary energy to actuate said brake means to release said device and hold said mechanism.

4. A receiving means for use in a value transmitting or measuring system wherein impulses of auxiliary energy are produced at points in cycles of regular intervals of time corresponding to the magnitude of the value to be transmitted or measured, comprising a mechanism movable in regular cycles of equal intervals of time synchronously with the before-mentioned cycles, means for actuating said mechanism, a yielding connection between said mechanism and said means permitting actuation of said mechanism by said means in one direction and relative movement between said means and said mechanism in the opposite direction, a device, a yielding connection between said device and said mechanism whereby said device is actuated by said mechanism in one direction and is relatively movable thereto in the other direction, brake means for simultaneously holding said device against movement and releasing said mechanism and vice versa, means actuated by the first-mentioned means to actuate said brake means to hold said device and release said mechanism, means actuated by said impulses of auxiliary energy to actuate said brake means to release said device and hold said mechanism, means for indicating the time positions of said impulses in corresponding intervals of time including two relatively movable members, and a yielding connection between one of said members and said device.

5. In a receiving means for use in a value transmitting or measuring system wherein impulses of auxiliary energy are produced at points in cycles of regular intervals of time corresponding to the magnitude of the value to be transmitted or measured, the combination of a revoluble shaft, means for rotating the same in regular cycles synchronously with the before-mentioned cycles, a yielding connection between said shaft and said means to permit corresponding and relative movement thereof, a device rotatable co-axially with said shaft, a yieldable connection between said device and said shaft to permit corresponding and relative movement thereof, brake means for simultaneously holding said device against movement and releasing said shaft and vice versa, means controlled by said actuating means for said shaft to actuate said brake means to hold said device and release said shaft, and means controlled by said impulses of energy for actuating said brake means to release said device and hold said shaft.

6. A receiving means for use in a value transmitting or measuring system wherein impulses of auxiliary energy are produced at points in cycles of regular intervals of time corresponding to the magnitude of the value to be transmitted or measured, comprising a mechanism movable in regular cycles of equal intervals of time synchronously with the before-mentioned cycles, means for actuating said mechanism, a yielding connection between said mechanism and said means permitting actuation of said mechanism by said means in one direction and relative movement between said means and said mechanism in the opposite direction, a movable device one position of which is to correspond to the time position of each of said impulses, a yielding connection between said device and said mechanism whereby said device is actuated by said mechanism in one direction and is relatively movable thereto in the other direction, a brake for holding said device against movement, a second brake for holding said mechanism against movement, means connecting said brakes for simultaneous movement to hold said device and release said mechanism and vice versa, means controlled by said impulses of energy for actuating said brakes to release said device and hold said mechanism, and means actuated by said mechanism actuating means to actuate said brakes to release said mechanism and hold said device.

7. A receiving means for use in a value transmitting or measuring system wherein impulses of auxiliary energy are produced at points in cycles of regular intervals of time corresponding to the magnitude of the value to be transmitted or measured, comprising a mechanism movable in regular cycles of equal intervals of time synchronously with the before-mentioned cycles, means for actuating said mechanism, a yielding connection between said mechanism and said means permitting actuation of said mechanism by said means in one direction and relative movement between said means and said mechanism in the opposite direction, a movable device one position of which is to correspond to the time position of each of said impulses, a yielding connection between said device and said mechanism whereby said device is actuated by said mechanism in one direction and is relatively movable thereto in the other direction, a brake for holding said device against movement, a second brake for holding said mechanism against movement, means connecting said brakes for simultaneous movement to hold said device and release said mechanism and vice versa, means controlled by said impulses of energy for actuating said brakes to release said device and hold said mechanism, and means actuated by said mechanism actuating means synchronously therewith to actuate said brakes to release said mechanism and hold said device at the beginning of each of said cycles of operation.

8. The means set forth in claim 1 with the addition of indicating or recording means including two relatively movable parts, and means yieldingly connecting one of said parts to said movable device.

9. A receiving means for use in a value transmitting or measuring system wherein impulses of auxiliary electric energy are produced at points in cycles of regular intervals of time corresponding to the magnitude of the value to be transmitted or measured, comprising a member movable in cycles of regular intervals of time synchronous with the intervals in which the impulses are produced, means for so moving said member, a movable device one position of which is to correspond to the time position of each of said impulses, means yieldingly connecting said device and said member for corresponding and relative movement, means normally restraining said device from movement, and electro-magnetic means actuated by said impulses of electric energy for actuating the last-named means to release said device to permit it to assume a position corresponding to the position of said member at the instant of said impulse.

10. A receiving means for use in a value transmitting or measuring system wherein impulses of auxiliary energy are produced at points in cycles of regular intervals of time corresponding to the magnitude of the value to be transmitted or measured, comprising a mechanism movable in regular cycles of equal intervals of time synchronously with the before-mentioned cycles, means for actuating said mechanism, a yielding connection between said mechanism and said means permitting actuation of said mechanism by said means in one direction and relative movement between said means and said mechanism in the opposite direction, a movable device one position of which is to correspond to the time position of each of said impulses, a yielding connection between said device and said mechanism whereby said device is actuated by said mechanism in one direction and is relatively movable thereto in the other direction, brake means for simultaneously holding said device against movement and releasing said mechanism and vice versa, said brake means being normally influenced to hold said mechanism, means actuated by said mechanism actuating means to move said brake means to release said mechanism, detent means for so retaining said brake means, and means controlled by said impulses of energy to actuate said detent means to release said brake means and permit the latter to hold said mechanism and release said device whereby said device may assume a position corresponding to the position of said mechanism at the instant of said impulse.

11. The means set forth in claim 5 with the addition of means for indicating or recording the time positions of said impulses including two relatively movable parts, one of which is revoluble co-axially with said device, and means yieldingly connecting said part to said device.

12. A receiving means for use in a value transmitting or measuring system wherein impulses of auxiliary energy are produced at points in cycles of regular intervals of time corresponding to the magnitude of the value to be transmitted or measured, comprising a member revoluble in cycles of regular intervals of time synchronous with the before-mentioned cycles, means for revolving said member, a device revolubly mounted co-axially with said member and one position of which is to correspond with the time position of each of said impulses, means yieldingly connecting said device and said member for corresponding and relative movement, means normally restraining said device from movement with said member but actuated by an impulse of energy for releasing said device to permit it to assume a position corresponding to the position of said member at the instant of said impulse, means for indicating or recording the time positions of said impulses including two relatively movable parts one of which is revoluble co-axially with said device, and means yieldingly connecting said part to said device.

ERICH ROUČKA.